Dec. 24, 1963 H. A. MANLEY ETAL 3,115,314

TAPE HANDLING APPARATUS

Filed Feb. 1, 1961 3 Sheets-Sheet 1

INVENTORS
Herbert A. Manley
George R. Crane
By Alan C. Rose
Attorney

INVENTORS
Herbert A. Manley
George R. Crane
By Alan C. Rose
Attorney

INVENTORS
Herbert A. Manley
George R. Crane
By Alan C. Rose
Attorney

United States Patent Office 3,115,314
Patented Dec. 24, 1963

3,115,314
TAPE HANDLING APPARATUS

Herbert A. Manley, Los Angeles, and George R. Crane, Santa Monica, Calif., assignors to Litton Systems, Inc., a corporation of Maryland Filed Feb. 1, 1961, Ser. No. 86,423
4 Claims. (Cl. 242—55.12)

This invention relates to an apparatus for handling tape, and is applicable both to magnetic and punched tape.

In prior art tape-handling apparatus, the arrangements for controlling tension on the tape have generally been relatively crude. Thus, for example, as the tape is fed from one reel and wound up on another, the effective moment arm of the tape about the axis of the reel changes; accordingly, with arrangements in which a constant torque is provided, the tape tension varies over broad ranges. These extremes in tape tension cause tape abuse, with the resultant tape breakage, machine errors and "down-time." In certain other arrangements which have been proposed, long loops of tape have been provided which extend down on either side in the front of commercial data-handling machines. These extended loops are awkward, and require excessive space. The principal defects of the prior art, therefore, include excessive bulkiness in some arrangements and poor tension regulation and a lack of smoothness in control of other arrangements.

An important object of the present invention is to improve the tension regulation and smoothness of control of tape-handling apparatus without sacrificing compactness and economy.

In accordance with an illustrative embodiment of the invention, the foregoing object is achieved through the use of individual electrically actuated torque clutches for each of the two reels on which the tape is stored, and a pair of mechanical control arms associated with each of the reels. One of the two control arms senses the amount of tape on its associated reel and continuously controls the electric current applied to the clutch, and thus applies the proper amount of torque to the reel. The second control arm forms part of a shock roller assembly and maintains a short loop of tape under carefully regulated tension. Switches connected to the shock roller assembly control the power applied to the clutch when the pressure becomes too high or low under abnormal operating conditions. The tape-driving arrangements are stopped when the tape breaks, through the action of this shock roller assembly.

Another problem in the tape-handling field involves the high-speed stopping and starting of the tape. In accordance with the present invention, rapid stopping and starting is accomplished through the use of a pair of electromagnets having pivoted armatures. These electromagnets are mounted on either side of the transducer head, between the reading head and one of the reels. Each of the pivoted armatures engages a brake member at one end and a rubber roller or "puck" at the other end. On the other side of the tape are a matching brake member and a driving capstan, respectively. Thus, when the armature is pivoted in one direction the tape is braked, and pivoting in the opposite direction entrains the tape between the rotating capstan and the rubber puck to pull it across the reading head in the desired direction. When the tape is being moved in a given direction, one of the armatures is tilted so that the puck engages the tape, and the other armature is in the neutral position out of contact with the tape. When the tape is to be stopped, however, both armatures are tilted in the braking direction and the tape is stopped practically instantly. In this regard the present reader provides "on character" stopping. Thus, for example, upon receipt of a code indication on the punched tape which requires immediate stopping of the tape reader, the tape is halted before advancing to the next subsequent code group. In view of the normal speed of operation of the tape at 20 inches per second, and the use of a punched tape having 10 code groups per inch, this corresponds to a stopping time of less than two milliseconds, when the finite size of the punched holes is considered.

The novel features which are believed to be characteristic of the invention, both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and does not define limitations of the invention.

Figure 1:
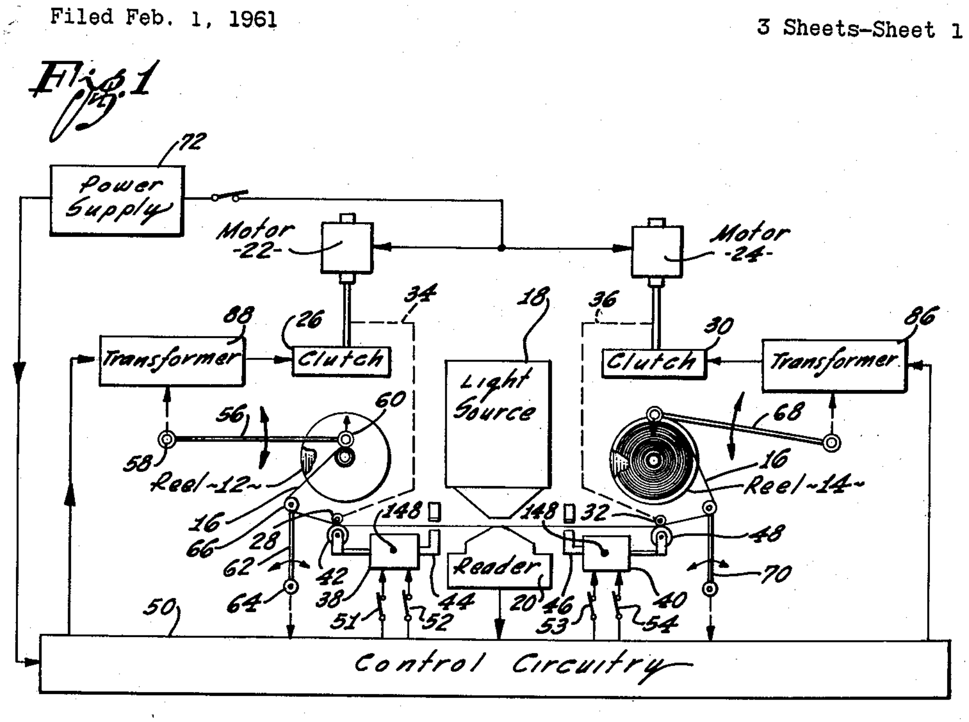
FIG. 1 is a schematic diagram of the apparatus and circuit of the present invention.

With reference to the drawings, FIG. 1 shows a tape handling apparatus in which tape is stored on reels 12 and 14. In the particular example considered, punched tape designated by the reference character 16, is employed. Collimated light from the source 18 is directed through the openings in the tape 16 to the tape reader 20.

Driving power to move the tape is provided by a pair of counter-rotating motors 22 and 24. The motor 22 drives both the clutch 26 and the capstan 28. Similarly, the motor 24 provides input power to the clutch 30 and the capstan 32. The mechanical drives from the motors 22 and 24 to the capstans 28 and 32 are indicated by the dashed lines 34 and 36, respectively.

Electromagnets 38 and 40 are provided with pivoted armatures carrying a rubber roller or "puck" at one end and a braking element at the other end. In the case of the electromagnet 38, the armature has a puck 42 at its left hand end and a braking member 44 at its right hand end, as shown in FIG. 1. Similarly, a brake member 46 and puck 48 are associated with the relay 40. When the electromagnet 40 is energized to raise the puck 48 towards the capstan 32, the tape 16 is pulled across the reading head 20 and is wound onto reel 14. Under these conditinos, the electromagnet 38 is in the neutral position, with its puck 42 and brake member 44 both spaced from the tape 16. When it is desired to move the tape in the opposite direction, the puck 42 is actuated toward engagement with the capstan 28 and the electromagnet 40 is operated to the neutral position. Normally, the electromagnets are actuated by the control circuit 50; however, manual switches 51 through 54 are provided to energize the polarized relays 38 and 40 manually, when this mode of operation is desired.

Each of the reels is provided with a pair of control arms for regulating its torque. Thus, the reel 12 has a first mechanical arm 56 which rotates about pivot point 58 and includes a roller 60 which rests on the tape within the reel 12. Also associated with the reel 12 is a second arm 62 which forms part of the shock roller assembly. The arm 62 is pivoted about point 64 and carries a spool-like member 66 at its outer end which forms a loop in the tape extending from reel 12 to the reader 20. As the tension increases or decreases on the shock arm 62, it pivots about the axis 64. When the tension increases beyond a predetermined level so that the arm rotates clockwise to an extreme position, a limit switch is actuated which controls the torque of the reel-driving apparatus to reduce the tension, as explained in some detail below. Other switches are actuated when the tension is reduced below a predetermined level and when the tension is eliminated completely, indicating a break in the tape. The follower arm 68 and the shock roller arm 70 associated with reel 14 perform functions which correspond to those described above for the mechanical arms 56 and 62, respectively, associated with reel 12.

Operating power is provided for the motors 22 and 24, and for the control circuit 50, from the power supply 72.

Figure 2:
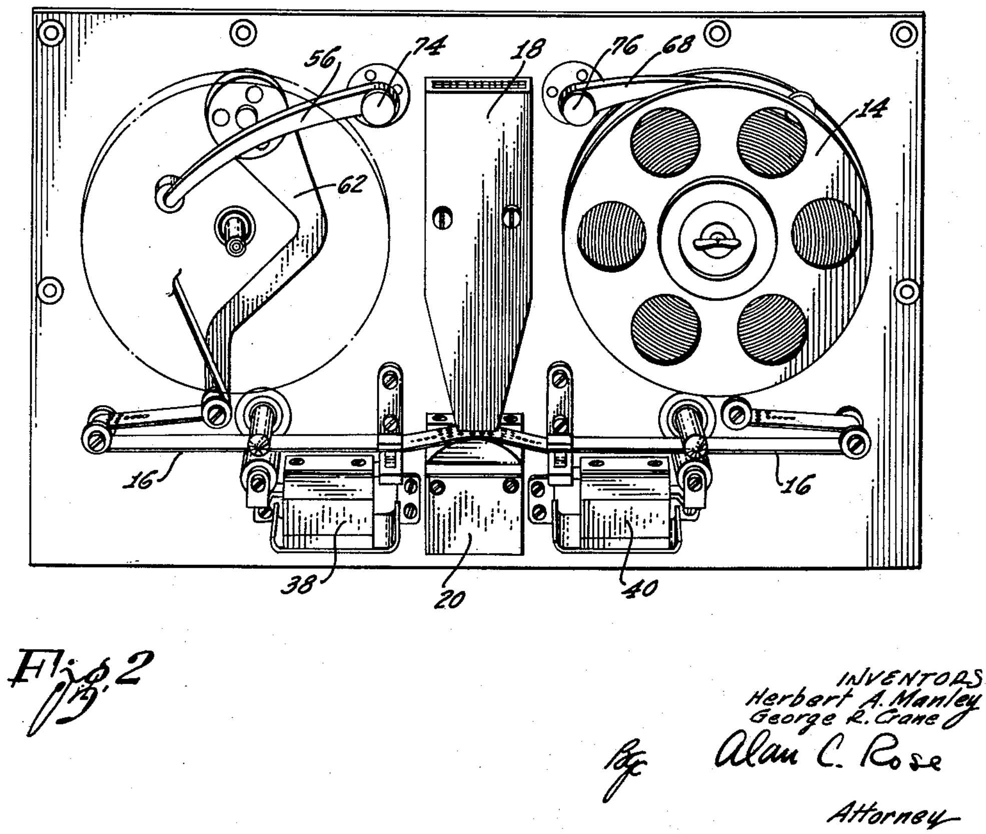
FIG. 2 represents the detailed structural arrangement of a number of important components of the present invention.

FIG. 2 indicates the physical relationship between a number of components which were merely shown diagrammatically in FIG. 1. Particularly to be noted in FIG. 2 are the positions of the arms 56 and 62. These arms appear clearly in view of the fact that the reel 12 has been removed for the purpose of the showing of FIG. 2. It may also be noted that the reel 14 is filled with tape, and consequently that the follower arm 68 is in a counterclockwise position. The manner in which rotation of the arms 68 and 56 changes the reel-driving torque will be discussed in detail below.

The follower arms 56 and 68 are provided with thumb buttons 74 and 76, respectively. As described below, these thumb buttons are attached to a latching mechanism which hold the arms 56 and 68 in the raised positions while the rolls of tape are being changed. Pressure on the thumb buttons 74 and 76 releases the latches and permits proper torque regulatory operation of the follower arms 56 and 68. Other components shown in FIG. 2 are numbered to correspond with the same elements as shown in FIG. 1 and need no additional explanation.

Figures 3, 4:
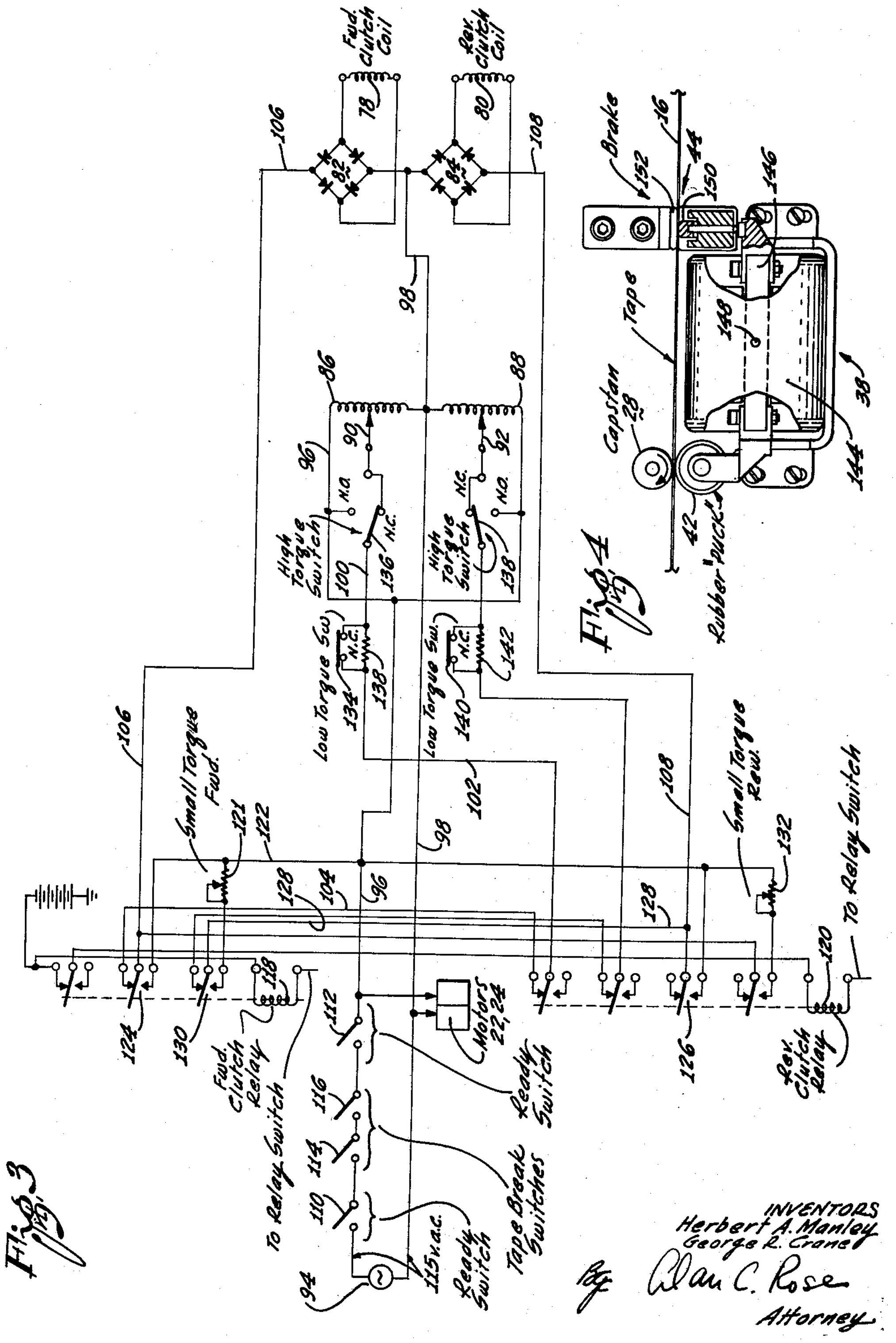
FIG. 3 is a circuit diagram including a portion of the control circuitry indicated in block diagram form in FIG. 1.
FIG. 4 is a detailed showing of one of the electromagnetic relay tape control assemblies in accordance with the invention.

FIG. 3 shows a portion of the control circuity 50 of FIG. 1 in somewhat greater detail. More particularly, FIG. 3 is directed to the control circuits for the clutches 26 and 30 of FIG. 1. The forward clutch coil 78 forms a part of the clutch 30 of FIG. 1, and the reverse clutch coil 80 is included in the clutch assembly 26 of FIG. 1. The clutch coils 78 and 80 must be energized by direct current; accordingly, the full wave rectification circuits 82 and 84 are provided for the coils 78 and 80, respectively.

In operation, the motors 22 and 24 (see FIG. 1) are driven at a constant speed. The torque applied to the reels 12 and 14 is varied by adjusting the current applied to the coils 78 and 80 of the clutches 26 and 30, respectively. The power to clutch coil 78 is controlled by the "forward" variable auto-transformer 86, and power to the reverse clutch coil 80 is controlled by the "reverse" variable auto-transformer 88.

The transformers 86 and 88 have adjustable taps 90 and 92 which are controlled by the follower arms 68 and 56, as shown in FIG. 1. When the reel 14 (see FIGS. 1 and 2) is empty, it is desired to decrease the torque, to provide uniform tension through the shorter lever arm; accordingly, a lower level of power must be applied to clutch coil 78. Under these circumstances, the tap 90 of transformer 86 is moved toward the bottom of winding 86, as shown in FIG. 3, to apply a relatively low voltage to the rectifier 82. To maintain constant tape tension, the tap 90 is progressively moved up as the reel fills up. The circuit from the source of line voltage 94 to the rectifier 82 will now be traced out. The line voltage is applied through leads 96 and 98 across the coil of the auto-transformer 86. The output applied to rectifier 82 is taken from the tap 90 through a circuit which includes lead 100, lead 102 crossconnection 104 and lead 106. In a similar manner, the voltage developed at tap 92 is applied through lead 108 to rectifier 84.

A number of switches are included in the lead 96 which connects the source of power 94 with the transformer coils 86 and 88. These switches include the two ready switches 110 and 112 and the two tape break switches 114 and 116. As mentioned above, the ready switches are connected to the mechanical follower arms 56 and 68, and the tape break switches are coupled to the mechanical arms 62 and 70.

The relays 118 and 120 control the high speed mode of operation of the reader. In particular, the relay 118 provides high speed operation in one direction for the reels 12 and 14, and the relay 120 provides high speed operation in the opposite direction. With the relay 118 de-energized, the contacts are in the position shown in FIG. 3 and the tape-driving mechanism operates in its slow-speed mode. Under these conditions, essentially equal and opposite forces are applied to the tape on reels 12 and 14 under the control of the adjustable transformer 86 and 88 and the clutch coils 78 and 80, as discussed above. To continue, the driving force to move the tape is provided by one of the capstans 28 or 32, depending on the desired direction of operation in this slow-speed mode.

When the relay 118 is operated, however, the tape-driving mechanism is switched to its high-speed mode. Under these conditions, one of the two clutch coils is energized with full power, while the other coil is energized at a lower level of power, supplied through the resistor 121. When relay 118 is energized (and relay 120 is de-energized), full voltage is applied to rectifier 82. This is accomplished through the connection from lead 96 via lead 122 and the contacts 124 to lead 106. Rectifier 84 is energized at a lower level through resistor 121 by connections including lead 108, lead 128, contacts 130 and lead 122. In this high-speed mode of operation of the apparatus, both of the puck and capstan-driving arrangements are inoperative by virtue of de-energization of the relays 40 and 42. Thus, the tape is pulled by the application of full torque to one of the reels 12 or 14 against a small hold-back torque on the other reel.

For reverse high-speed operation, the relay 120 is operated and relay 118 is de-energized. With this combination, the reverse clutch coil 80 is fully energized through contacts 126 and the forward clutch coil 78 has a low level of power applied to it through the resistor 132.

Several contacts which are operated by the shock roller arms 62 and 70 of FIG. 1 must now be considered. Specifically, the switches 134 and 136 are associated with the shock roller arm 70 of FIG. 1. When the loop of tape is pulled too tightly, indicating unduly high forces, switch 134 is opened. This inserts resistor 138 into the circuit and reduces the power supplied to the forward clutch coil 78. The switch 140 and resistor 142 perform the same function for the reverse clutch coil 80. If the loop gets too large, the shock roller arm 70 operates switch 136 to bypass tap 90. Full voltage is then briefly applied to the forward clutch coil 78 to reduce the loop to its normal operating position. Switch 138 associated with shock roller arm 62 performs the same function for the reverse clutch coil 80. As noted above, the third switch associated with each of the shock roller arms 62 and 70, is the tape brake switch 114 or 116 in series with the power lines.

FIG. 4 is a detailed showing of electromagnet 38 which operates to drive or brake the tape 16, as discussed above in connection with FIG. 1. Another electromagnet 40 which is similar in construction to the assembly as shown in FIG. 4, is also employed in the overall tape-handling assembly shown in FIG. 1.

The electromagnet 38 of FIG. 4 includes a coil structure 144 and a central armature 146. The armature 146 is pivoted about a central point 148, for actuation in either direction in a manner well known in the polarized electromagnetic relay art. The coil structure 144 may be in the form of a single coil, with arrangements for applying current to it in opposite directions; or it may be in the form of two separate oppositely wound coils which are alternately energized. In either event, the armature 146 moves in the counterclockwise direction when energized with magnetic flux of one polarity and in the clockwise direction when energized by magnetic flux from coil structure 144 in the opposite direction. In the absence of energization the armature is biased to a neutral position. The armature 146 carries a rubber-coated roller, or puck 42 at one end, and engages a brake assembly 44 at its other end. When the armature 146 of the electromagnet is actuated in the clockwise direction, the brake assembly 44 is released and the puck 42 is moved up to grip the tape 16 between the puck and the rotating capstan 28. When the armature is actuated in the counterclockwise direction, however, the movable brake member 150 is forced up to clamp the tape 16 against the opposing brake member 152, thus stopping the tape. Pressure is concurrently released at the puck 42 so that capstan 28 may rotate freely without engaging tape 16.

The electromagnet 40, as shown on the other side of the reading head 20 in FIG. 1, is similar in construction to electromagnet 38 but has the positions of the puck and the braking assembly reversed. The two electromagnets are controlled together to provide braking action with the assemblies 44 and 46 for rapid stopping of the tape. In addition, the control circuitry is arranged so that only one of the two pucks 42 and 48 are in the raised driving position, thus avoiding tape breakage which would occur with the two capstans applying force to the tape 16 in opposite directions.

Figure 5:
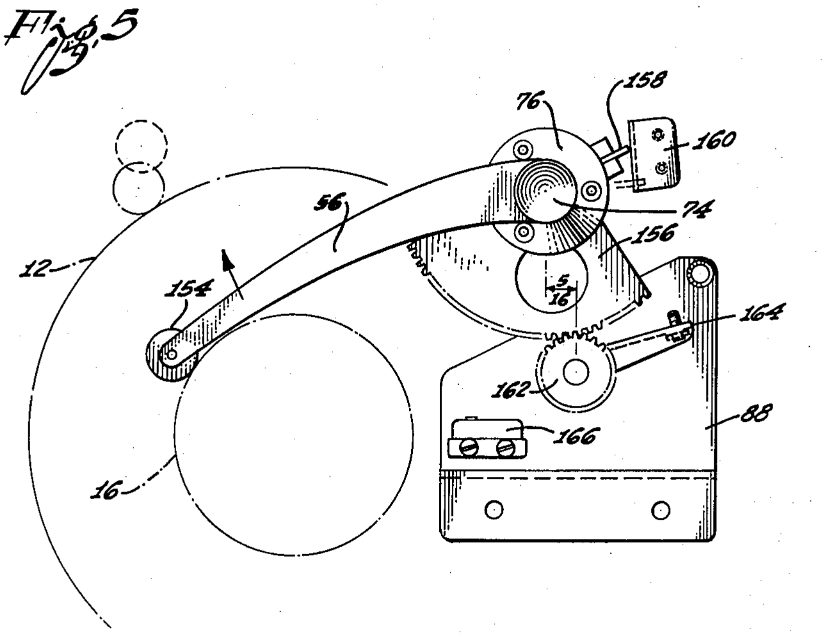
FIG. 5 is a drawing of one of the mechanical control arms shown in FIG. 2.

FIG. 5 is a detailed representation of the reel control assembly including the arm 56 of FIG. 2. For the purposes of FIG. 5, the faceplate of the apparatus of FIG. 2 is not shown. When assembled in completed form, only the arm 56, the roller 154, the thumb button 74, and the mounting plate 76 appear in front of the faceplate of the apparatus. The gear sector 156, the spring detent 158, and the latch plate 160 are all located behind the faceplate in the apparatus of FIG. 2. The variable transformer 88 as shown in FIG. 1 is also mounted on the reverse side of the face plate shown in FIG. 2.

In operation, the roller 154 rides on the surface of the roll of tape on the reel 12. As the roll builds up on the reel, the arm 56 moves in a clockwise direction. This causes angular rotation of the gear sector 156 and rotates the meshing gear 162, thereby moving the tap 92 on the winding of the transformer as shown in FIG. 3. Attached to the rotating gear 162 is an arm 164 which is moved to engage the microswitch 166 when the arm 56 is in the extreme clockwise position. The spring detent 156 simultaneously engages a recess in the latch plate 160 to hold the arm 56 in this extreme clockwise position. It is in this position that the rolls of tape may be removed and inserted into the apparatus, as the roller 154 is then well above the surface of the tape. After new rolls have been loaded onto the tape handling apparatus and threaded through the reading head, the thumb buttons 74 and 76 are depressed. This releases the spring detent 158 from the recess in the latch plate 160 and permits movement of the arm 56 under biasing force from a spring (not shown). As the arm 56 moves from its extreme clockwise position, the ready switch 166 is actuated to close contacts 110 in the power circuit, as shown in FIG. 3.

Figure 6:
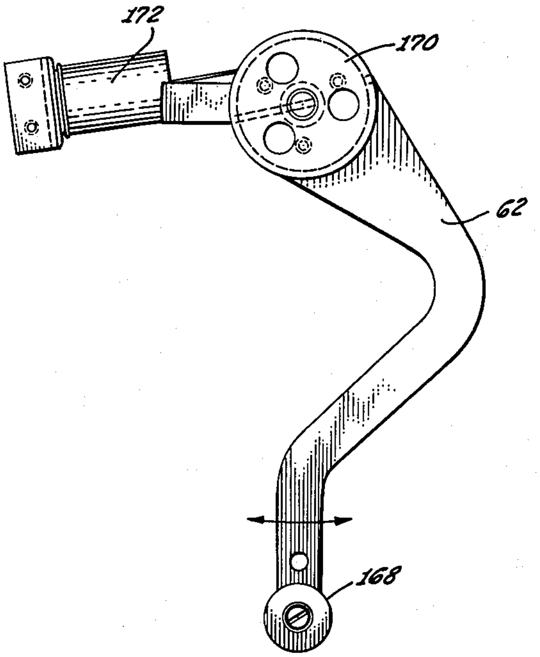
FIG. 6 illustrates one of the shock roller assemblies of FIG. 2.

The shock roller assembly is shown in detail in FIG. 6. The shock roller assembly includes the arm 62 as shown in FIG. 2 and a spool-like plastic roller element 168. These two elements and the mounting plate 170 appear on the front of the faceplate of the unit as shown in FIG. 2. Other elements, including a dashpot 172 and three switch contact assemblies (not shown) are located behind the faceplate. The shock roller assembly including the arm 62 is spring-biased in the coutnerclockwise direction to exert a predetermined force on the tape 16. When the force exceeds a predetermined level, or drops to a level below a predetermined minimum point, or if the tape breaks, various switches are actuated as discussed above. These include the switches 114, 116, 134, 136, 138 and 140, as shown in FIG. 3 and discussed above.

To restate the advantages of the invention, the present sophiticated tension controlling apparatus serves to minimize tape abuse, thus avoiding errors and tape breakage. The dual electromagnetic braking and puck actuating arrangements permit simple and poistive "on-character" stopping, and rapid resumption in speed of the tape. Furthermore, these two features cooperate to provide a unitary tape handling apparatus having unique reliability and smoothness of operation.

It is to be understood that the above-described arrangements are illustrative of the application of the principles of the invention. Numerous other arrangements may be devised by those skilled in the art without departing from the spirit and scope of the invention. Thus, by way of example and not of limitation, the clutches may be energized from sources such as variable resistors or amplifiers and not by transformers. In addition, mechanical changes which do not depart significantly from the simplicity of applicant's structures may be employed. Accordingly, from the foregoing remarks, it is to be understood that the present invention is to be limited only by the spirit and scope of the appended claims.

What is claimed is:

1. A tape handling apparatus comprising a pair of reels, means for guiding tape between the reels, a transducer head mounted near the path of the tape, individual electrically controlled torque clutches coupled to each of said reels, motor means for supplying mechanical drive to said clutches, individual variable transformers each having its output connected to supply power to one of said clutches, each of said transformers being provided with a mechanical control, means for sensing the amount of tape on each reel and for continuously varying the mechanical control of the corresponding transformer to provide constant tension on said tape during normal operating conditions, a pair of shock roller arms pivotally mounted on either side of said transducer head to receive loops of tape, means for rapid tension correction of the tape by controlling the drive of said reels in accordance with tape pressure relating to abnormal operating conditions as sensed by said shock roller arm, and means for rapid stoppage of the reels in the event of tape breakage, first and second driven capstans mounted adjacent said tape on either side of said transducer head, first and second pressure rollers, first and second movable brake members, means for selectively operating said rollers into engagement with said tape at respective points opposite said capstans and for selectively operating said brake members into engagement with said tape on either side of said head, said operating means including a first polarized electromagnet having a pivoted armature, said first roller and said first brake member being operatively coupled to opposite ends of said armature, and a second polarized electromagnet also having a pivoted armature with the second roller and second brake member being mounted for actuation by the armature at its opposite ends.

2. A tape handling apparatus comprising a pair of reels, means for guiding tape between the reels, a transducer head mounted near the path of the tape, individual electrically controlled torque clutches coupled to each of said reels, motor means for supplying mechanical drive to said clutches, individual electrical components each having its output connected to supply power to one of said clutches, each of said power supply components being provided with a mechanical control, means for sensing the amount of tape on each reel and for continuously varying the corresponding mechanical control to provide constant tension on said tape during normal operating conditions, a pair of shock roller arms pivotally mounted on either side of said transducer head to receive loops of tape, means for rapid tape tension correction by controlling the drive of said reels in accordance with tape pressure relating to abnormal operating conditions as sensed by said shock roller arms, and means for rapid stoppage of reels in the event of tape breakage, first and second driven capstans mounted adjacent said tape on either side of said transducer head, first and second pressure rollers, first and second movable brake members, means for selectively operating said rollers into engagement with said tape at respective points opposite said capstans and for selectively operating said brake members into engagement with said tape on either side of said head, said operating means including a first electromagnet having a pivoted armature, said first roller and said first brake member being mounted at opposite ends of said armature, and a second electromagnet also having a pivoted armature with the second roller and second brake member being mounted for actuation by the armature at its opposite ends.

3. A tape handling apparatus comprising means for supporting a tape in a predetermined position for longitudinal movement, a transducer head located near said tape, first and second capstans mounted adjacent said tape on either side of said head, first and second pressure rollers, first and second movable brake members, immediately adjacent and on opposite sides of said head between said head and said capstans, self-powered means for selectively operating either one of said rollers into engagement with said tape at a respective point opposite its associated capstan and for selectively operating said brake members simultaneously into engagement with said tape on both sides of said head, said operating means including a first electromagnet having a pivoted armature with said first roller and said first brake member mounted at opposite ends of said electromagnet armature, and a second electromagnet also having a pivoted armature with the second roller and second brake member being operatively linked to its opposite ends.

4. A tape driving and stopping mechanism comprising means for supporting a tape in a predetermined position for longitudinal movement, a transducer head mounted near said tape, first and second driven capstans mounted adjacent said tape on either side of said head, first and second pressure rollers, first and second movable brake members immediately adjacent and on opposite sides of said head between said head and said capstans, self-powered means for selectively operating either one of said rollers into engagement with said tape at a respective point opposite its associated capstan and for selectively operating said brake members simultaneously into engagement with said tape on both sides of said head, said operating means including a first polarized electromagnet having a pivoted armature, said first roller and said first brake member being mounted at opposite ends of said electromagnet armature, and a second polarized electromagnet also having a pivoted armature for self-powered actuation with the second roller and second brake member being mounted at its opposite ends.

References Cited in the file of this patent

UNITED STATES PATENTS

| | | |
|---|---|---|
| 2,365,691 | Fodor | Dec. 26, 1944 |
| 2,666,596 | Rosenburgh et al. | Jan. 19, 1954 |
| 2,814,676 | House | Nov. 26, 1957 |
| 2,855,160 | Fundingsland | Oct. 7, 1958 |
| 2,856,464 | Groom | Oct. 14, 1958 |
| 2,904,275 | Selsted et al. | Sept. 15, 1959 |
| 3,002,671 | Brumbaugh et al. | Oct. 3, 1961 |

FOREIGN PATENTS

| | | |
|---|---|---|
| 230,942 | Australia | Oct. 24, 1960 |
| 810,674 | Great Britain | Mar. 18, 1959 |